(12) United States Patent
Carter et al.

(10) Patent No.: US 9,879,730 B2
(45) Date of Patent: Jan. 30, 2018

(54) COMPACT METAL AND PLASTIC OLDHAM COUPLER WITH AN INTEGRAL GEAR ON AN INPUT PLATE AND A RETRACTION SPLINE ON AN OUTPUT PLATE

(71) Applicant: LEXMARK INTERNATIONAL, INC., Lexington, KY (US)

(72) Inventors: Daniel Lee Carter, Georgetown, KY (US); Brian Reed Spencer, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 430 days.

(21) Appl. No.: 14/686,140

(22) Filed: Apr. 14, 2015

(65) Prior Publication Data
US 2016/0305485 A1   Oct. 20, 2016

(51) Int. Cl.
| | |
|---|---|
| *F16D 3/04* | (2006.01) |
| *F16D 66/02* | (2006.01) |
| *G03G 21/16* | (2006.01) |
| *G03G 15/00* | (2006.01) |

(52) U.S. Cl.
CPC .............. *F16D 3/04* (2013.01); *F16D 66/02* (2013.01); *G03G 15/757* (2013.01); *G03G 21/1647* (2013.01); *G03G 2221/1657* (2013.01)

(58) Field of Classification Search
CPC .......... F01C 17/066; F16D 3/04; F16D 66/02; G03G 15/757; G03G 21/1647; G03G 2221/1657; Y10T 464/20

USPC ............................ 464/23, 102–105; 399/167
See application file for complete search history.

(56) References Cited

U.S. PATENT DOCUMENTS

| | | | |
|---|---|---|---|
| 6,179,716 B1 * | 1/2001 | Asa ........................... | F16D 3/04 464/153 |
| 7,130,562 B2 | 10/2006 | Foster et al. | |
| 8,064,800 B2 * | 11/2011 | Carter ................... | F16D 1/0858 399/167 |
| 8,257,185 B2 | 9/2012 | Carter et al. | |
| 2008/0138113 A1 * | 6/2008 | Murrell ................ | G03G 21/186 399/167 |

FOREIGN PATENT DOCUMENTS

DE    2735664 A1 *    3/1978   ............ F01C 17/066

* cited by examiner

*Primary Examiner* — Josh Skroupa

(57) ABSTRACT

An Oldham coupler assembly for transferring rotary power between two shafts in an imaging device. The Oldham coupler includes an input plate and an output plate made of plastic and a star plate made of metal moveably coupled to and positioned in between the input plate and the output plate. A plastic retraction spline assembly is slidably retained in the output plate and engages with a drive member in an imaging unit. The location of the retraction spline assembly on the output plate allows for an increased diameter leading to increased torsional stiffness. The input plate includes gear teeth integrally molded into the outer circumference thereof helping to decrease the overall width of the Oldham coupler. Pairs of wheels are fastened to inner faces of the input and output plates and used to moveably couple the star plate to the input and output plates.

21 Claims, 10 Drawing Sheets

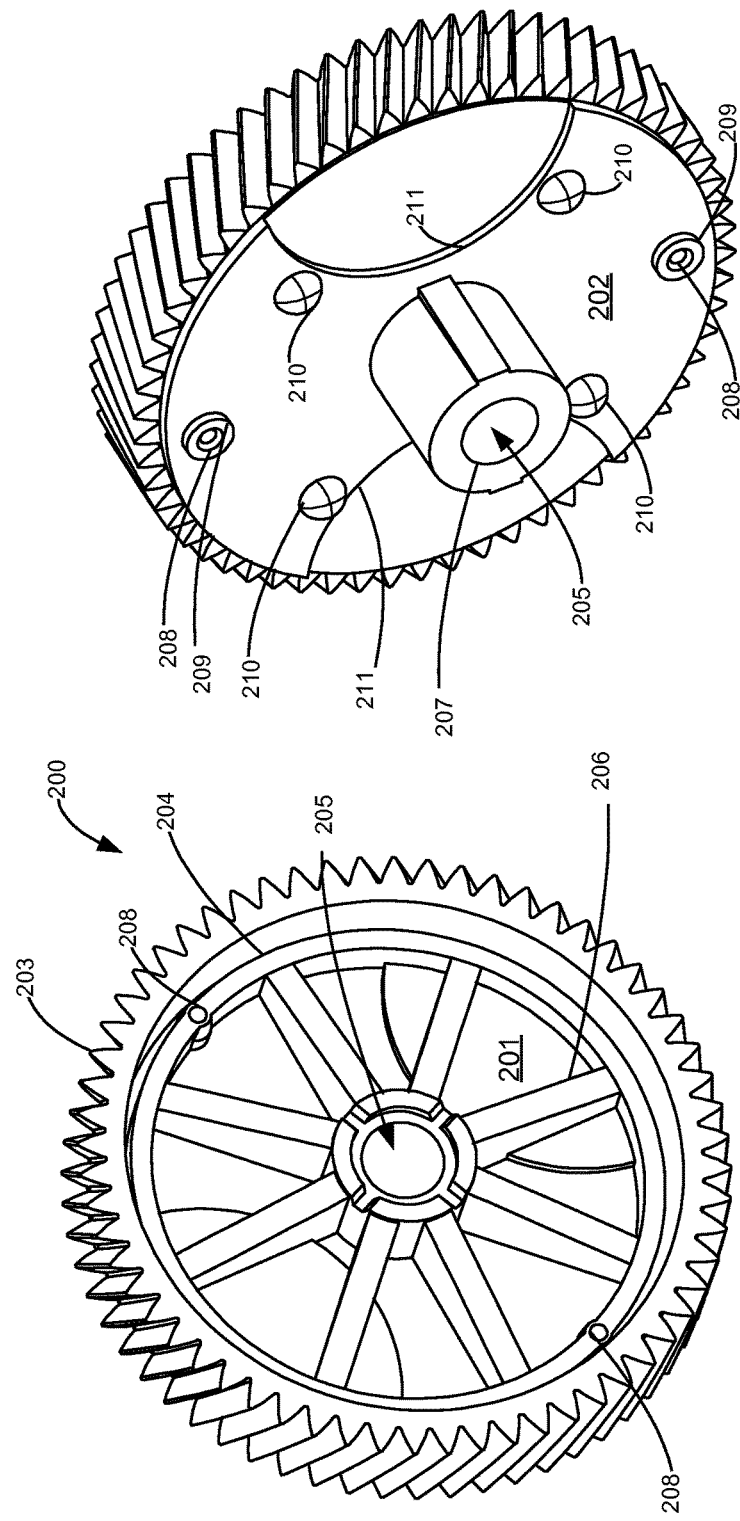

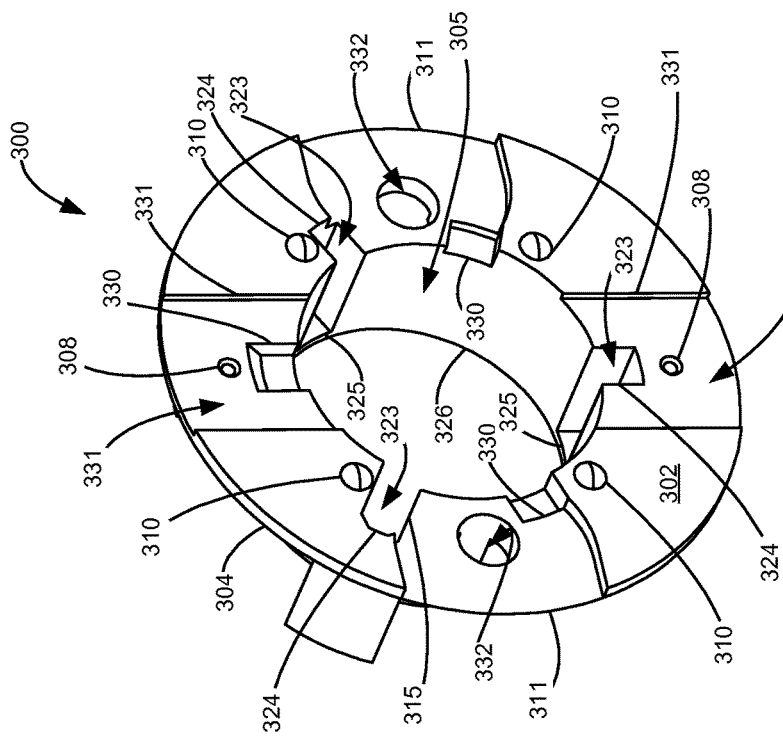
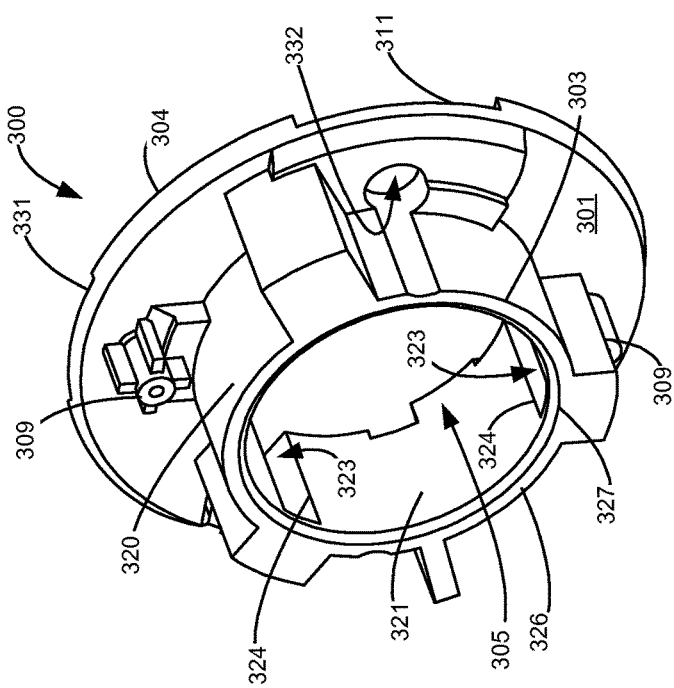
Figure 10
Figure 9

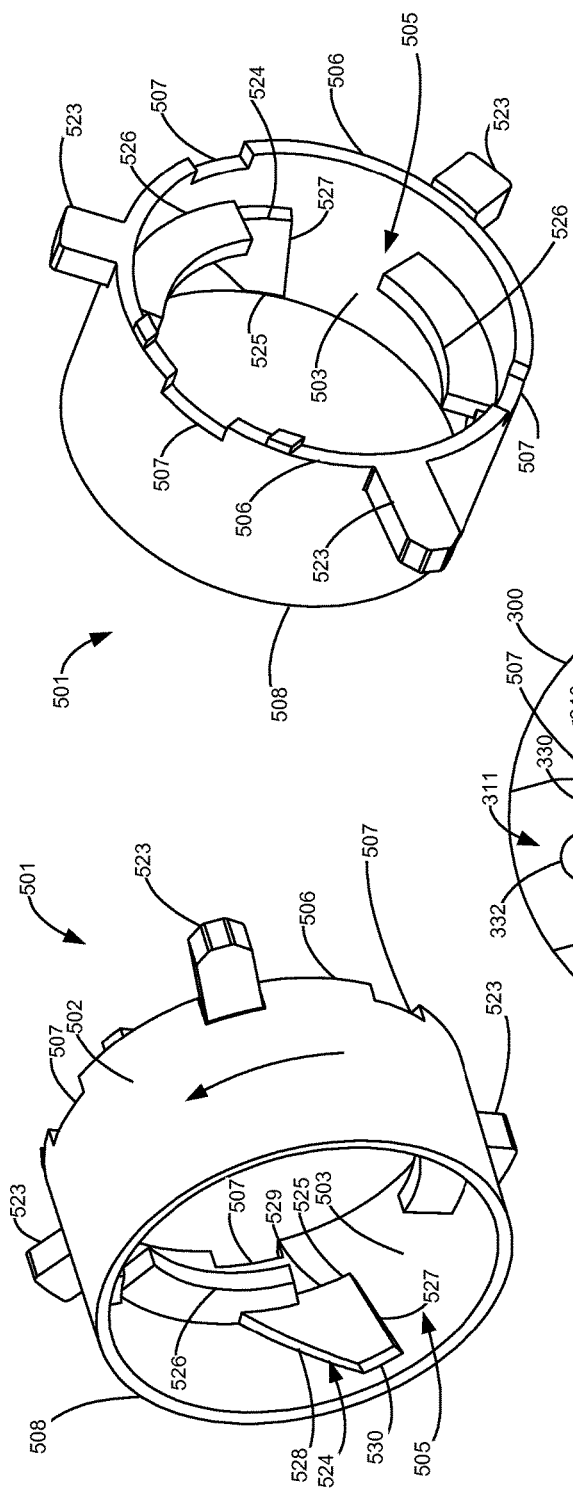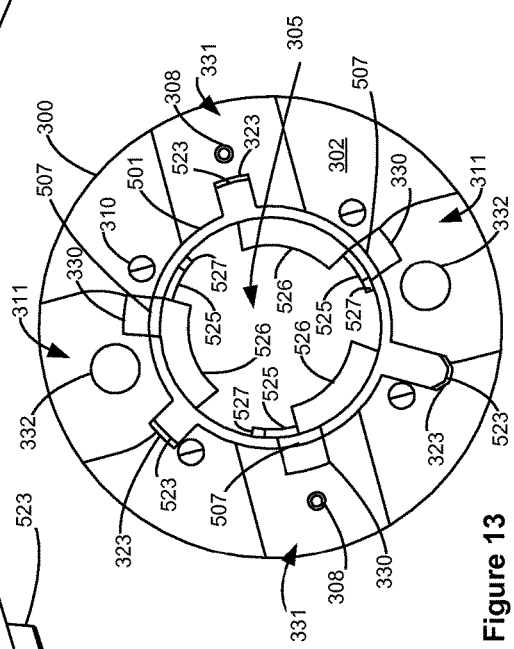
Figure 12
Figure 11
Figure 13

COMPACT METAL AND PLASTIC OLDHAM COUPLER WITH AN INTEGRAL GEAR ON AN INPUT PLATE AND A RETRACTION SPLINE ON AN OUTPUT PLATE

CROSS REFERENCES TO RELATED APPLICATION

None.

BACKGROUND

Field of the Invention

The present invention relates generally to image formation devices, and in particular to a coupling mechanism between an imaging unit and its drive source in a color electrophotographic printer; specifically, an Oldham coupler for transferring rotary power between two parallel non-collinearly aligned shafts.

Description of the Related Art

Oldham couplers have been employed for decades in drive systems of diverse machines for transferring torque or rotary power between two parallel but non-collinear and/or non-radially aligned rotating shafts. In the past, Oldham couplers have been used to couple two shafts together. Further retraction splines have been provided on Oldham couplers, and such retraction splines travelled through the center of the gearing which limited their size and torsional stiffness.

Monochromatic or color electrophotographic printers appear to be sensitive to low frequency oscillations of the drive system. As the Oldham coupler oscillates when driving the imaging units of the printer, banding may occur on the printed media sheet with band heights in the range of 0.5 mm to 2 mm. By using a stiffer drive system, the natural frequency of the drive system will increase and shorten the wavelength of the banding to the point that it is not visible on the page to the naked eye. In the past Oldham couplers with retraction splines made of all plastic experienced this problem. A combination of metal input and output plates with a plastic star plate has been used to improve the torsional stiffness of the Oldham coupler while reducing the amount of banding on the printer page. However, such combination Oldham couplers are relatively expensive.

As process speeds increase in printers, motors speeds are limited. This forces gear ratios to be lowered with increased spacing of the gear teeth with respect to the media sheet being printed. This increase gear teeth spacing will make fine line jitter more apparent to the naked eye. Slower printers have used higher gear ratios to the motor with gear teeth spacing as low as 0.2 mm. These machines were less likely to have jitter issues. Faster printers are more sensitive to the stiffness of the drive system and visual jitter.

Also, with prior Oldham coupler designs, the input and output plates of the coupler engaged with the two shafts on which the gears were mounted. This arrangement increased the overall axial width of the combination. Further the room needed for the stud or screw attachment of the wheels used in the prior art Oldham coupler adds to the width. This leads to a smaller wheel to axle ratio and a higher side load generated by the Oldham coupler.

It would be advantageous to have an Oldham coupler that provides increased torsional stiffness but at a lower cost than current combination Oldham couplers. It would be further advantageous to have an Oldham coupler having a reduced side load. It would be further advantageous to be able to have a plastic retraction spline having increased torsional stiffness.

SUMMARY OF THE INVENTION

According to an exemplary embodiment of the present invention, there is provided an Oldham coupler assembly for transferring rotary power between two shafts in an imaging unit of an imaging apparatus. The Oldham coupler includes an input plate and an output plate made of a first material, a star plate made of a second material positioned in between and slidably coupled to the input plate and the output plate and a spline assembly slidably attached to the output plate. The input plate has gear teeth extending around the outer circumference thereof. The output plate has a collar in which the spline assembly is slidably moveable in an axial direction and is biased to axially extend away from the output plate. The spline assembly consists of a sleeve including a plurality of radially extending exterior retention lugs and a plurality of interior drive lugs spaced about the circumference of the outer and inner walls of the sleeve. The retention lugs are slidably received through corresponding inner open ends of corresponding blind channels axially extending along the inner surface of the collar. The drive lugs are engageable with corresponding drive dogs of a drive member on an imaging unit. The first material may be a plastic and the second material may be a metal.

BRIEF DESCRIPTION OF THE DRAWINGS

The above-mentioned and other features and advantages of the various embodiments of the invention, and the manner of attaining them, will become more apparent and will be better understood by reference to the accompanying drawings.

FIGS. 7-8 illustrate the input plate of the Oldham coupler where FIG. 7 is a perspective view of outer surface of the input plate and FIG. 8 is a perspective view of the inner surface of the input plate.

FIGS. 9-10 illustrate the output plate of the Oldham coupler where FIG. 9 is a perspective view of outer surface of the output plate and FIG. 10 is a perspective view of the inner surface of the output plate.

FIGS. 11-12 illustrate the spline sleeve insertable into the output plate of FIGS. 9-10 where FIG. 11 is a perspective view of outer side of the spline sleeve and FIG. 12 is a perspective view of the inner side of the spline sleeve.

FIG. 13 illustrates the spline sleeve of FIGS. 11-12 inserted into the output plate.

FIG. 14 is a perspective view from the input plate side and FIG. 15 is a perspective view from the output plate side.

DETAILED DESCRIPTION

Figure 1:
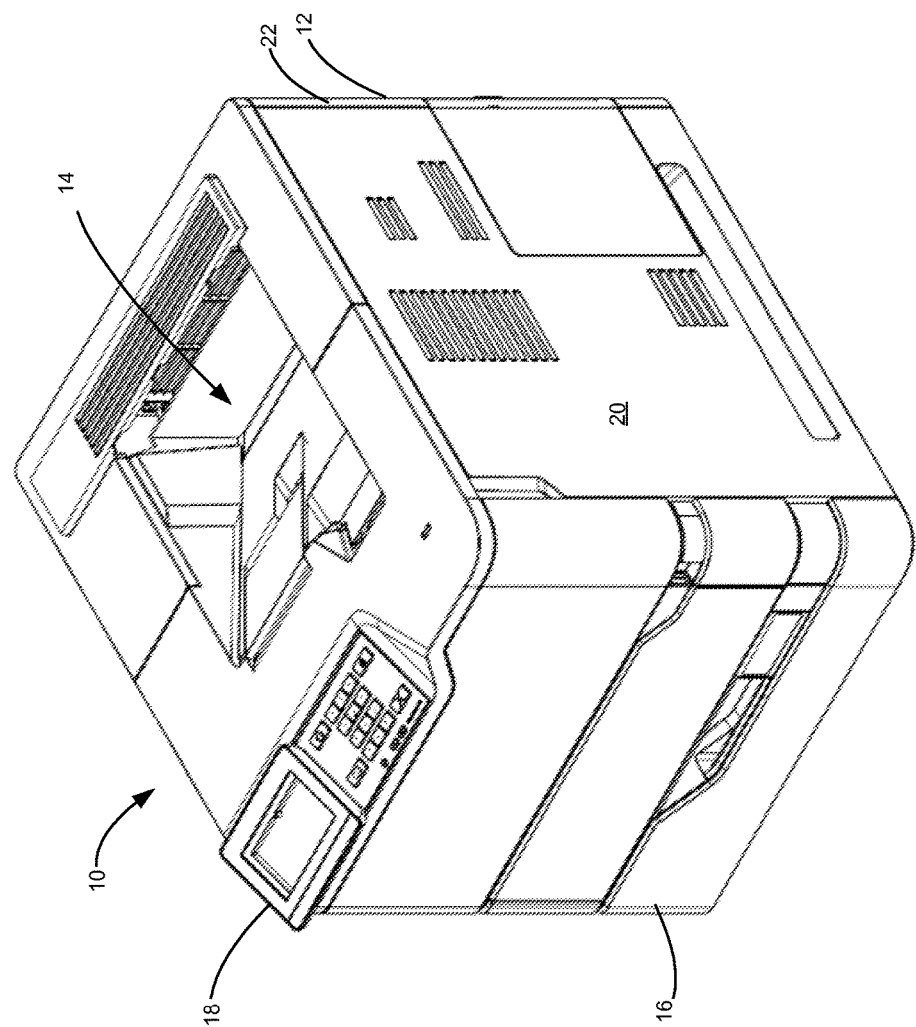
FIG. 1 is a representative imaging device.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference will now be made in detail to the example embodiment(s) of the present disclosure as illustrated in the accompanying drawings. Whenever possible, the same reference numerals will be used throughout the drawings to refer to the same or like parts.

Figure 2:
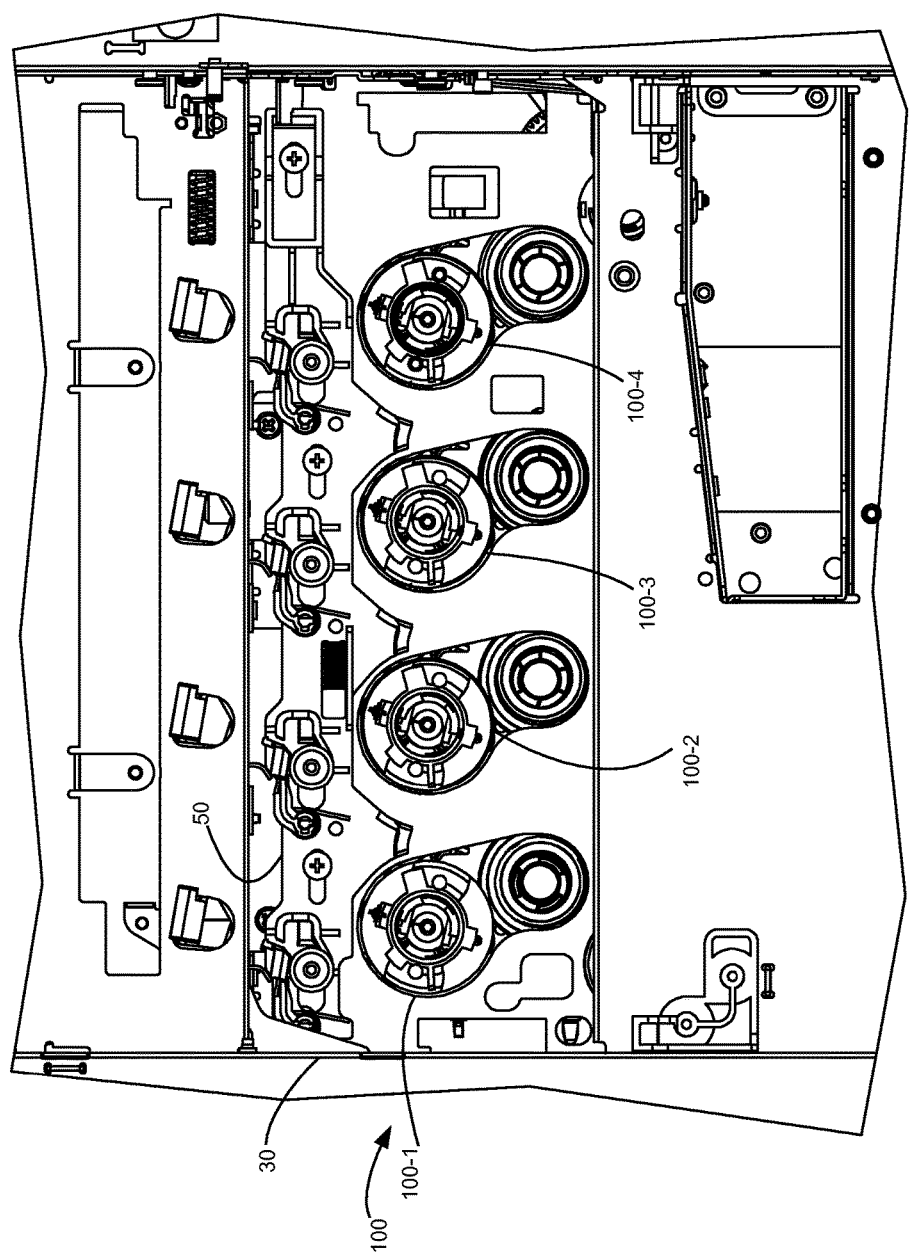
FIG. 2 is an internal view of the imaging device of FIG. 1 showing a plurality of drive assemblies each having an Oldham coupler assembly according to one embodiment of the present invention.
Figure 3:
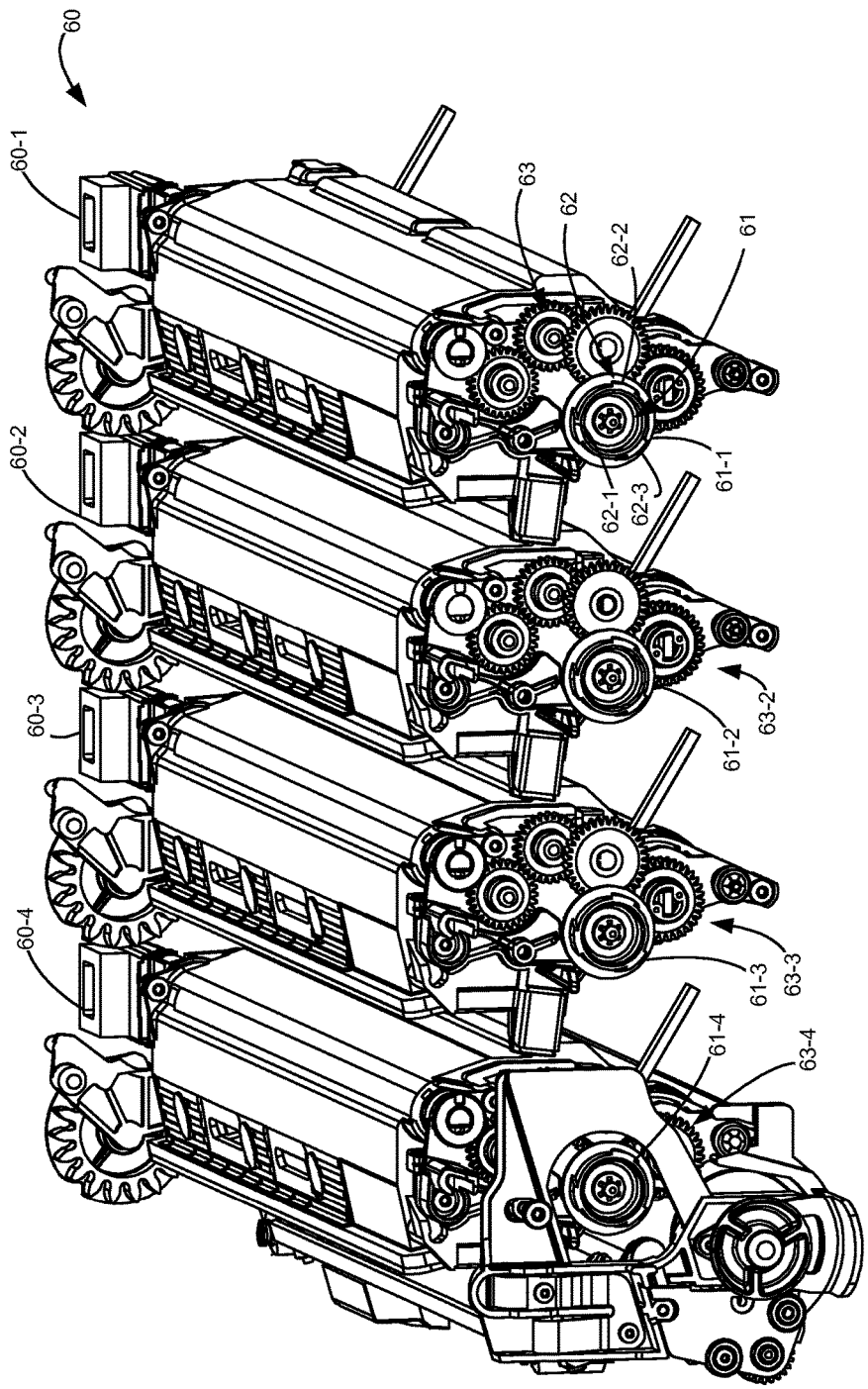
FIG. 3 is a perspective view of four imaging units that are insertable into the imaging device of FIG. 2 and which will engage with a respective one of the Oldham coupler assemblies shown in FIG. 2.

FIG. 1 depicts a color imaging device 10 including a housing 12 with a media output area 14 on top, a removable media input tray 16, a user interface 18 and a side panel 20 that opens by pivoting about a rear edge 22 to expose the interior of imaging device 10. FIG. 2 illustrates imaging device 10 with side panel 20 and imaging units removed to expose the drive system 50 mounted to a frame 30 internal to imaging device 10. Drive system 50 includes an Oldham coupler, generally designated 100. Four Oldham couplers 100-1-100-4 are shown. FIG. 3 illustrates the removed imaging units, generally designated 60. Four imaging units 60-1-60-4 are shown. The four imaging units 60-1-60-4 may each contain a different color of toner such as yellow, cyan, magenta, and black, respectively. Should imaging device 10 be monochromatic, typically, only a black imaging unit would be used.

As is known, each imaging unit 60 includes a photoconductive drum for transferring a toned image to a media sheet along with various toner metering and transfer rolls and a developer roll for supplying toner to the photoconductive drum. Typically, the developer roll is driven by drive system 50. A drive member, generally designated 61 and attached to the housing of the imaging unit 60, drives various components within imaging units 60 via a gear train, generally designated 63. Four drive members 61-1-61-4 are shown and interface with respective gear trains 63-1-63-4 and with respective Oldham couplers 100-1-100-4 to receive torque from drive system 50. Each drive member 61 has one or more drive dogs, generally designated 62, that engage with correspond drive lugs provided in each of the Oldham couplers 100-1-100-4. As shown, each of drive members 61-1-61-4 has three drive dogs 62-1, 62-2, 62-3 spaced about the outer circumference. Because each drive member is substantially the same only drive member 61-1 has its drive dogs labeled.

Figure 4:
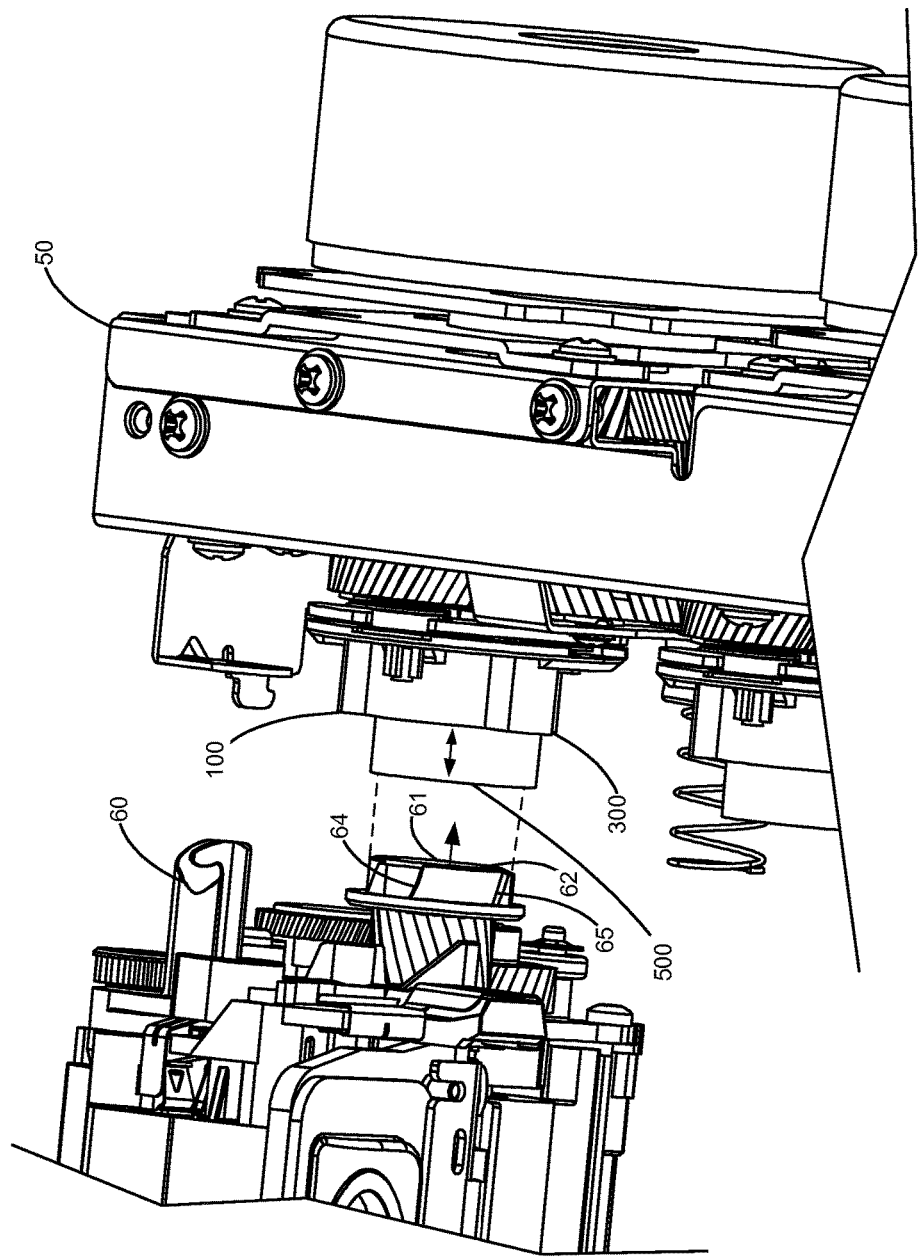
FIG. 4 is a partial sectional perspective view of an imaging unit being inserted into its corresponding Oldham coupler.

To engage with drive system 50 each imaging unit 60 is inserted into frame 30 of imaging device 10 until drive member 62 seats against the Oldham coupler 100 and the drive dogs 62 engage with the drive lugs of the Oldham coupler 100. FIG. 4 shows imaging unit 60 approaching drive system 50. Drive member 61 is about to enter a spline assembly 500 provided on the output plate 300 of Oldham coupler 100 as indicated by the two dashed lines. Spline assembly 500 partially retracts into output plate 300 as imaging unit 60 reaches its final inserted position within imaging device 10. Spline assembly 500 houses the drive lugs that will engage with drive dogs 62.

Figure 5:
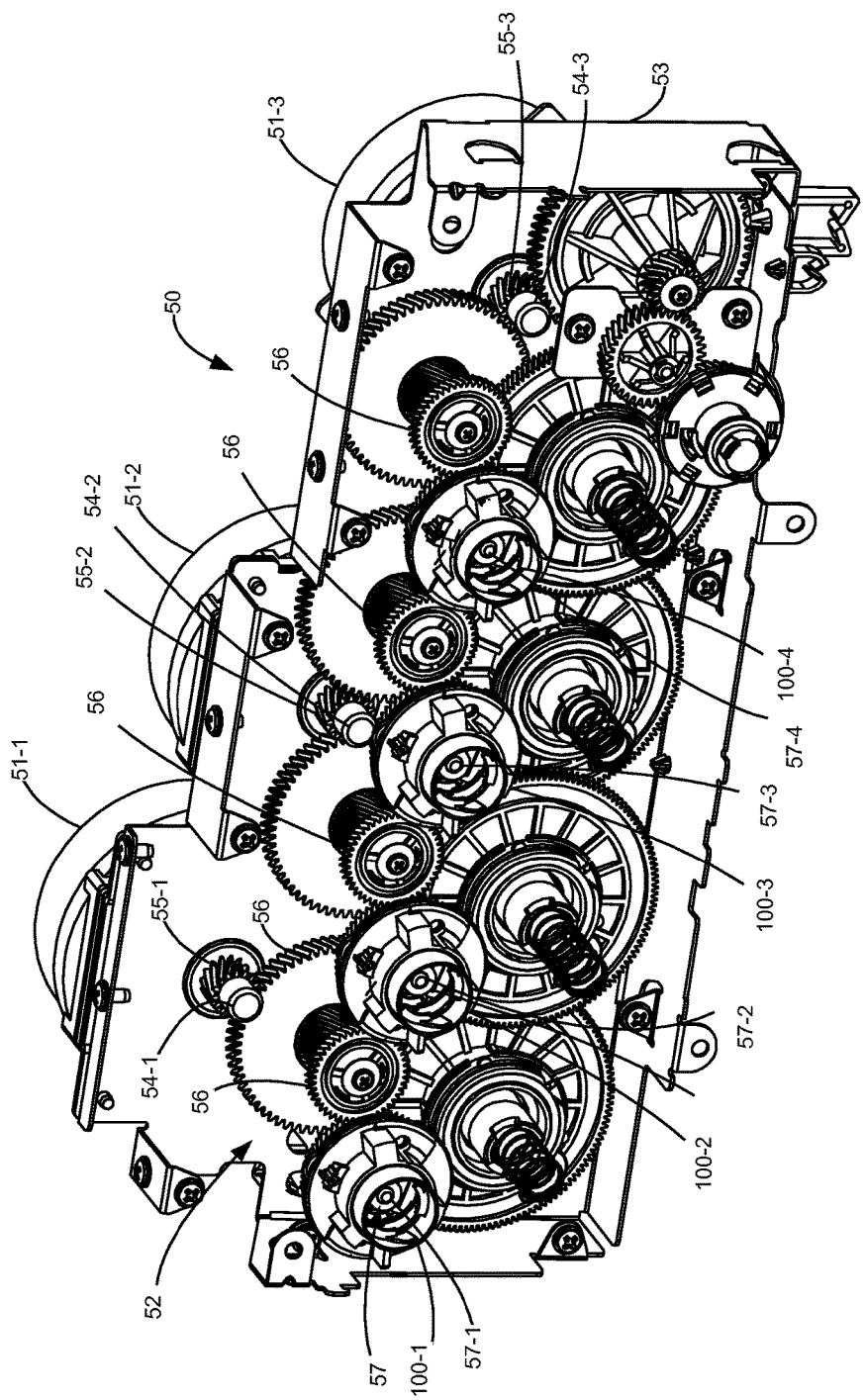
FIG. 5 is a perspective view of the drive mechanism having four Oldham couplers.

FIG. 5 illustrates the details of drive system 50. Four Oldham couplers 100-1-100-4 are shown. Three motors 51-1-51-3 and gear train 52 are shown mounted to a frame 53 for drive system 50. Attached to respective output shafts 54-1-54-3 of motors 51-1-51-3 are three pinion gears 55-1-55-3, respectively. Through various intermediate gears 56, pinion gear 55-1 drives Oldham coupler 100-1, pinion gear 55-2 drives Oldham couplers 100-2, 100-3 and pinion gear 55-3 drives Oldham coupler 100-4. Two, three or four motors may be used to drive Oldham couplers 100-1-100-4 and the number of motors used is a matter of design choice. The Oldham couplers 100 are mounted on a stud, generally designated 57, mounted to frame 53. As shown, the input plates of Oldham couplers 100-1-100-4 are rotatably mounted on studs 57-1-57-4.

Figure 6:
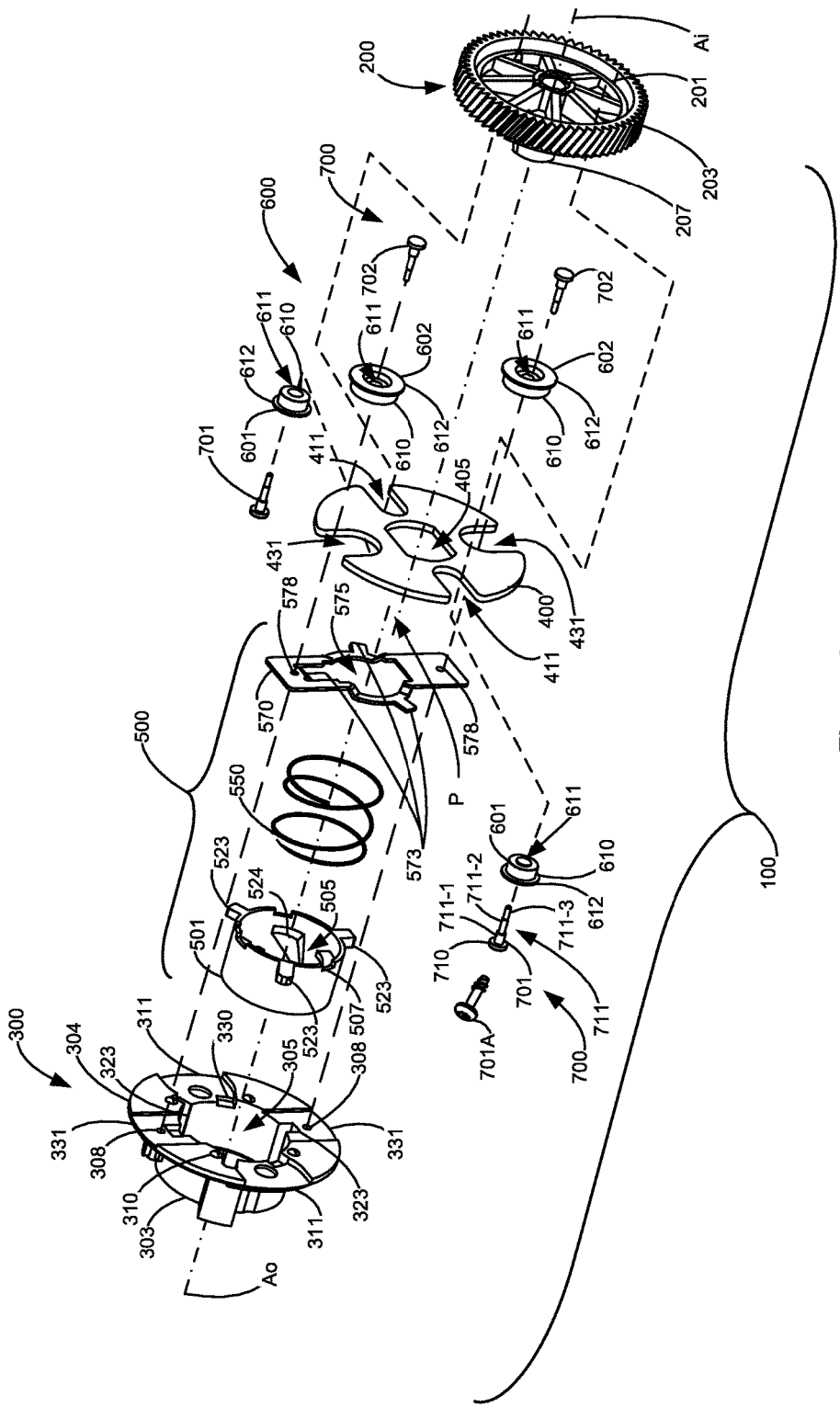
FIG. 6 is an exploded view of the Oldham coupler of FIG. 2 with a plastic input plate and output plate and a metal star plate and a retractable spline assembly housed in the output plate.

Details and features of the presently disclosed Oldham coupler will now be described with respect to FIGS. 6-15. FIG. 6 illustrates an exploded view of Oldham coupler 100 comprising an input plate 200, and output plate 300, a star plate 400, a spline assembly 500, wheels 600 and fasteners 700. Input plate 200 is shown having an axis of rotation designated Ai and output plate 300 as having axis of rotation designated Ao. At location P, the two axes are shown as being slightly offset as Oldham coupler 100 is designed to connect two parallel shafts that may be, but not necessarily are, offset.

Referring to FIGS. 6-8, input plate 200 has outer and inner faces 201, 202. A plurality of gear teeth 203 may be provided around an outer circumference 204 of input plate 200 and may be integrally molded therein. Center opening 205 receives stud 57. An e-clip or other fastener may be used to secure input plate 200 to stud 57. One or more spokes 206 may be molded on outer face 201 to further stiffen input plate 200. A post 207 having center opening 205 therethrough is provided on the inner face 202 of input plate 200. Post 207 provides additional bearing surface with stud 57 without further increasing the overall width of Oldham coupler 100. A pair of opposed holes 208 are provided through input plate 200, are positioned near the outer circumference, and are used with fasteners 700. On inner face 202, bosses 209 may be provided around opposed holes 208 and may have a chamfer to assist the entry of the fasteners 700 into the pair of opposed holes 208. One or more wear bumps 210 used to reduce the area of contact with star plate 400 may also be provided on inner face 202. Wear bumps 210 project about 1 mm above inner face 202. Also a pair of opposed scalloped channels 211 may be provided in inner face 202 to provide a travel surface for wheels 600 as star plate 400 orbits within Oldham coupler 100 during operation.

Referring to FIGS. 6 and 9-10, output plate 300 has outer and inner faces 301, 302. A collar 303 having a center opening 305 therethrough extends outwardly from outer face 301 in an axial direction. Center opening 305 is centered about output rotational axis Ao. Collar 303 has outer and inner walls 320, 321. A plurality of axial blind channels 323 are angularly spaced about inner wall 321. Three blind channels 323 angularly spaced about 120 degrees apart are illustrated. Each blind channel 323 has an open end 324 at inner face 302 and a blind or closed end 325 adjacent a free end 326 of collar 303. Center opening 305 receives retraction spline assembly 500 which is retained in output plate 300. A chamfer 327 may be provided about center opening 305 at the free end 326 of collar 303. A plurality of slots 330 are also angularly spaced about inner wall 321 and are open to inner face 302. Three slots 330 angularly spaced about 120 degrees apart are illustrated and are also positioned approximately 60 degrees from the plurality of blind channels 323. One or more wear bumps 310, similar to wear bumps 210, may also be provided on inner face 302. Four wear bumps 310 are shown.

A pair of opposed holes 308 for fasteners 700 are provided through output plate 300, are positioned near the outer edge 304 and may have a chamfer to assist the entry of the fasteners 700. The pair of opposed holes 308 are positioned orthogonally to the pair of opposed holes 208. On outer face 301, a boss 309 may be provided around each hole in the pair of opposed holes 308 to provide additional bearing surface for the fasteners 700. Also, a pair of opposed scalloped channels 311 may be provided in inner face 302 to provide a travel surface for wheels 600 as star plate 400 orbits within Oldham coupler 100. A second pair of opposed channels 331, positioned orthogonally to the pair of opposed scalloped channels 311, may also be provided in inner face 302 to seat a retention clip that is part of retraction spline assembly 500. A second pair of opposed holes 332 may be provided through output plate 300 to provide access for the insertion of fasteners 700 used to attach a pair of the wheels 600 to input plate 200.

Input plate 200 and output plate 300 may be of a first material such as plastic allowing input and output plates 200, 300 and their respective features previously described to be molded. Use of plastic reduces the weight and cost of Oldham coupler 100. Example plastics that may be used are, but not limited to, nylon, polyoxymethylene (POM), polypropylene, polyethylene, and acrylonitrile butadiene styrene (ABS).

Referring to FIG. 6, star plate 400 is generally circular in shape and has two pairs of opposed slots 411, 431 that are positioned orthogonally to one another. The two pairs of opposed slots 411, 431 provide tracks in which the wheels 600 travel. The pair of opposed slots 411 is shown having a generally horizontal orientation while the pair of opposed slots 431 has a generally vertical orientation. The width of each slot in the pair of opposed slots 431 is shown as being greater than those found in the pair of opposed slots 411. However, the width of slots in each of the pairs of opposed slots 411, 431 is a matter of design choice as it is desirable to have the largest slot width possible while still maintaining the needed stiffness in star plate 400. The larger the width of slots, the greater the diameter of the wheels 600 can be. This helps to ensure that wheels 600 rotate rather than slide in their respective pairs of opposed slots to reduce wear. A central opening 405 is provided in star plate 400 to allow post 207 to pass through star plate 400 and to further reduce the weight of star plate 400. Opening 405 is shown as being a squaricle having squared off upper and lower portions. This configuration allows the widths of the opposed slots 431 to be made wider than those of the opposed slots 411 while maintaining the needed stiffness for star plate 400. Star plate 400 is made of a second material. The second material may be selected from zinc, steel, nickel-phosphorous plated carbon steel, steel, aluminum, magnesium, brass, bronze or the like. In one form, star plate 400 may have an outer diameter of about 36 mm, opening 405 may have a diameter of about 12.6 mm with the squared off portion thereof having a width of about 10 mm, pair of opposed slots 411 may have a width of about 5.2 mm and a length of about 10 mm and pair of opposed slots 431 may have a width of about 8.1 mm and a length of about 10 mm.

Referring to FIGS. 6 and 11-13, spline assembly 500 comprises a sleeve 501, a biasing member 550, and a retainer clip 570. Spline assembly 500 may also be referred to as retraction spline assembly 500 as sleeve 501 may be slid into opening 305 of collar 303 during insertion of the corresponding imaging unit 60. Sleeve 501 has a central opening 505 therethrough, an outer wall 502 and an inner wall 503. A plurality retention lugs 523 extend radially outwardly from the outer wall 502 near an inner edge 506 of sleeve 501 while a plurality of drive lugs 524 extend radially inwardly from the inner wall 503. Three of each type of lug are shown angularly spaced about the circumference of sleeve 501. A plurality of notches 507 may also be provided in inner edge 506. The plurality of notches 507 are shown as being angularly spaced about the circumference of sleeve 501. Again three notches 507 are shown. The plurality of retention lugs 523 are angularly spaced to align with respective ones of the plurality of axial blind channels 323 in collar 303. The plurality of drive lugs 524 are angularly spaced to engage with respective ones of the plurality of drive dogs 62 on drive member 61. Sleeve 501 is sized to be slidably received into center opening 305 of collar 303 from the inner face 302 with the plurality of retention lugs 523 being slidably received into corresponding ones of the axially extending plurality of blind channels 323. An outer edge 508 of sleeve 501 axially extends beyond collar 303 due to the biasing force applied by biasing member 550.

As shown in FIGS. 11-13, each drive lug 524 has a drive member 525 and an optional seat member 526 provided at an inner end 529 of drive member 525. Drive lug 524 shown in FIG. 6 does not have optional seat member 526 shown. Drive member 525 has an engagement portion 527 and an optional ramp portion 528 that is angled such that drive lug 524 is wider along its inner end 529 than at an outer end 530. Biasing member 550 may have one end thereof seated against either drive lug 524 or, if provided, seat member 526. The engagement portion 527 engages with a corresponding engagement portion 64 on each of the plurality of drive dogs 62 (see FIG. 4) when sleeve 501 is rotated in the direction indicated by the arrow in FIG. 11 (counter-clockwise as shown). Should the rotational direction of sleeve 501 be reversed, surfaces 65 on the drive dogs 62 (see FIG. 4) will travel up the ramp portions 528 of the following drive lugs 524. When engagement portions 64 of drive dogs 62 clear engagement portions 527 of the following drive lugs 524, the engagement portions 64 will reengage with the engagement portions 527 of the following drive lugs 524. This is done to limit the amount of reverse rotation that may be applied to drive members 61 and the components within imaging units 60 driven by drive members 61.

The number of drive dogs 62, retainer lugs 523 and drive lugs 524 is a matter of design choice and should not be considered as a limitation of the disclosed Oldham coupler 100. Depending on size as few as one and more than three of these features may be provided. Further, the number retainer lugs 523 does not need to match the number of drive lugs 524.

Biasing member 550 in one form may be a coil spring 550. Retainer clip 570 is generally planar and rectangular in shape and has a central opening 575. Retainer clip 570 will seat in the second pair of opposed channels 331 on the inner face 302 of output plate 300. A plurality of tabs 573 are angularly spaced on retainer clip 570 and positioned around central opening 575. The plurality of tabs 573 will seat in corresponding ones of the plurality of notches 507 in sleeve 501 and in corresponding ones of the plurality of slots 330 in output plate 300. A pair of opposed holes 578 are provided near the upper and lower ends of retainer clip 578. When assembled, fastener pair 702 passes through corresponding holes of pair of opposed holes 578 and into corresponding holes of the pair of opposed holes 308. Biasing member 550 is compressed between the plurality of drive lugs 524 in sleeve 501 and retainer clip 570 when retainer clip 570 is attached to output plate 300. Coil spring 550 biases sleeve 501 in collar 303 axially outwardly from outer face 301 with the plurality of retention lugs 523 positioned adjacent to the blind ends 325 of the plurality of blind channels 323.

It should also be noted that openings 405, 505, 575 and the inner diameter of coil spring 550 are sized to allow for the passage of post 207 therethrough to further reduce the overall width of the assembled Oldham coupler 100.

Referring again to FIG. 6, wheels 600 are comprised of two pairs—wheel pairs 601, 602. Wheel pair 601 is used with respective slots in the pair of opposed slots 411. Wheel pair 602 is used with respective slots in the pair of opposed slots 431. Because wheel pairs 601, 602 are substantially the same except for size, the elements thereof will carry the same reference numbers. Each wheel has a core 610 having an opening 611 therethrough. The diameter of the cores 610 for wheel pair 601 in the pair of opposed slots 411 are sized to be rotated by star plate 400 as it moves; similarly for wheel pair 602 and the pair of opposed slots 431. Provided on one end of each core 610 is a flange 612 that has a diameter that is greater than the slot width in the pair of opposed slots with which it will be used. As illustrated, flanges 612 on wheel pair 601 have diameters that are greater than the widths of the pair of opposed slots 411 while flanges 612 on wheel pair 602 have diameters that are greater than the widths of the pair of opposed slots 431. The cores 610 of wheel pairs 601, 602 travel within respective slots in the pairs of opposed slots 411, 431, respectively. Example sizing for wheel pair 601 is about 6.4 mm for flange 612, about 5 mm for core 610 and about 1.56 mm for opening 611. Example sizing for wheel pair 602 is about 9.3 mm for flange 612, about 7.9 mm for core 610 and about 1.56 mm for opening 611. For both wheel pairs 601, 602, core 610 may have a length of about 2.2 mm and flange 612 a thickness of about 0.5 mm. Wheels 600 may be made of rubber or a crystalline thermoplastic acetal copolymer such as DURACON® M90-44 made by Polyplastics Co. of JR Shinagawa East Bldg., 18-1, Konan 2-chome, Minato-ku, Tokyo 108-8280, Japan.

Fasteners 700 are used to assemble input and output plates 200, 300, star plate 400, spline assembly 500 and wheels 600 together to form Oldham coupler 100. Fasteners 700 are comprised of two pairs—fastener pairs 701, 702—that are used to attach wheel pairs 601, 602 to input and output plates 200, 300, respectively. Fasteners pairs 701, 702 are, in one example form, press pins 701,702 are made of metal. Alternatively, fastener pairs 701, 702 may be screw-type fasteners such as screw 701A. When fastener pairs 701, 702 are press pins, each press pin has a head 710 and a shaft 711 having three shaft portions 711-1-711-3 of decreasing diameter going from the head 710. Because the same pin is used in fastener pairs 701, 702, only one pin is labeled for these features in FIG. 6. Head 710 has a diameter that is greater than opening 611 in core 610. Head 710 may be counter sunk in each wheel of wheel pairs 601, 602 to help decrease the overall assembly width of Oldham coupler 100. Shaft portion 711-1 may be about 1.5 mm in diameter and provides a bearing surface (axle) for the each wheel in wheel pairs 601, 602 as it passes through corresponding openings 611 in core 610. Openings 611 have a diameter that is slightly larger than that of shaft portion 711-1. Shaft portion 711-3 has a diameter of about 0.85 mm and is used as a guide or pilot for the press pin as it is inserted through openings 610 and the respective hole in pairs of opposed holes 208, 308, as the case may be. Shaft portion 711-2 has a diameter of about 1.0 mm and is press fit into the corresponding hole in the pairs of opposed holes 209, 308, as the case may be, which have a diameter of about 0.85 mm. The above dimensions are for purposes of illustration not limitation and are a matter of design choice.

Figures 14, 15:
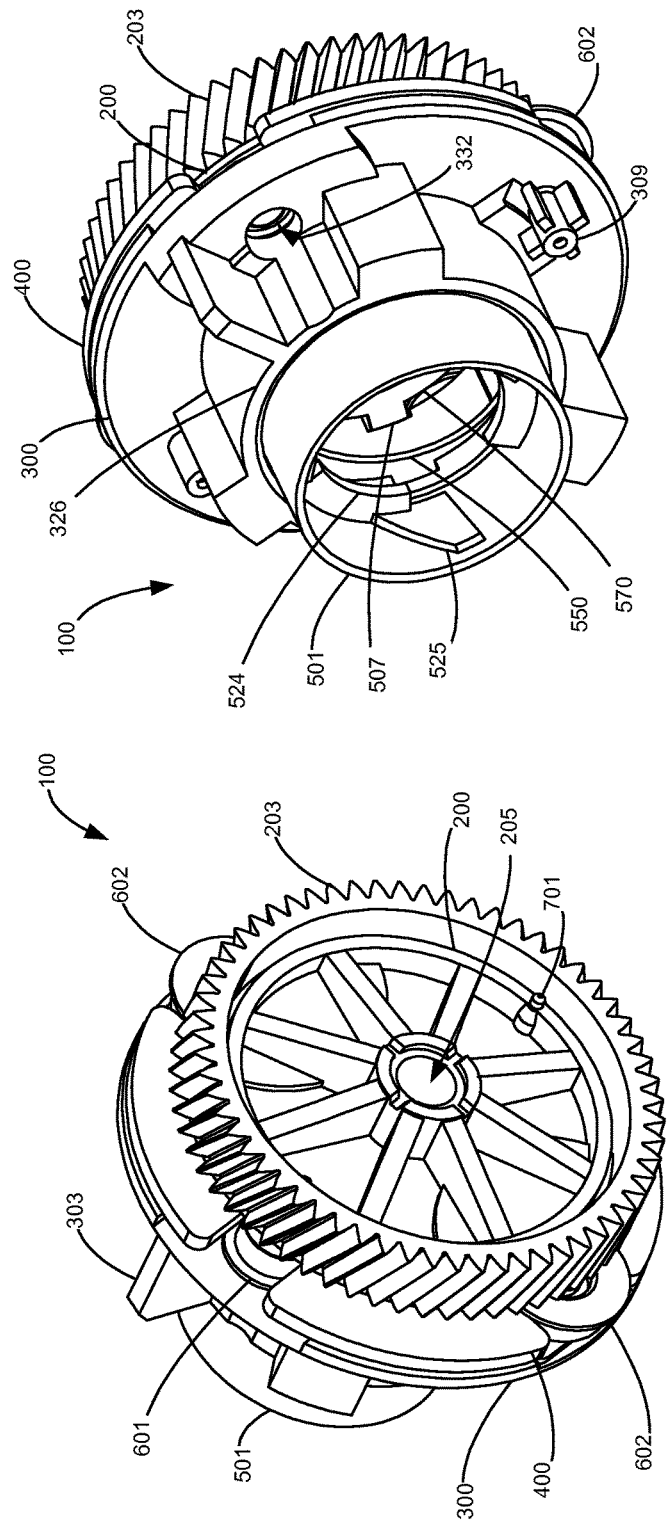
FIGS. 14-15 illustrate an assembled Oldham coupler where

FIGS. 14-15 illustrate the assembled Oldham coupler 100. When assembled, sleeve 501 is slidably engaged inside of collar 303 of output plate 300 and biased by biasing member 550 that is positioned between sleeve 501 and retainer clip 570. The spline assembly 500 is held by star plate 400, that is, in turn, held on its side that faces inner face 202 of input plate 200 by the flanges 612 of wheel pair 602. Fastener pair 702 runs through wheel pair 602, retainer clip 570 and into the pair of opposed holes 308 to moveably couple star plate 400 to output plate 300. Star plate 400 is also moveably coupled to input plate 200. The flanges 612 of wheel pair 601 engage the side of star plate 400 that faces inner face 302 of output plate 300. Fastener pair 701 passes through wheel pair 601 and into the pair of opposed holes 208 of input plate 200 to secure them to input plate 200. For the orientation shown in FIG. 6, star plate 400 is able to move vertically with respect to output plate 300 and horizontally with respect to input plate 200. In one example embodiment, star plate is able to move approximately 2.5 mm in each direction.

The flanges of wheel pair 601 ride in the pair of opposed scalloped channels 311 and those of wheel pair 602 ride in the pair of opposed scalloped channels 211. The second pair of opposed channels 331 also allow retainer clip 570 to be flush with inner surface 302 of output plate 300. The use of these channels reduces that width of the assembled Oldham coupler 100. The stiffness of Oldham coupler 100 is increased by combining the Oldham coupler input plate with the gear that drives it. Moving the retraction spline assembly 500 to the output side of the Oldham coupler allows for a larger diameter sleeve 501, thereby increasing its torsional stiffness. Sleeve 501 may have a larger diameter, for example about 19 mm, as compared to prior designs having sleeves with a diameter of about 10 mm. In those prior art designs, the sleeve therein had to pass through the center opening of the star plate and because of its smaller diameter its torsional stiffness was reduced. The increased diameter of sleeve 501 of the present retraction spline assembly 500 provides increased torsional stiffness that reduces jitter during driving of the imaging units 60 at higher process speeds providing improved print quality. The stiffness of provided by output plate 300 and spline assembly 500 is in the range of about 25 to about 30 in-oz/degree. In prior art designs a drive gear and input plate are separate pieces. By combining the drive gear for the Oldham coupler 100 with the input plate, as shown with input plate 200, the overall assembled Oldham coupler 100 is more compact.

The structural elements employed in the present invention of metal and plastic combination control the location and firmly secure the components together in a manner that will transmit high torque loads required to drive the imaging unit 60. The presently disclosed lower cost, lower weight composite Oldham coupler demonstrates a substantial reduction in jitter to be in the range of about 0.5 mm to about 2 mm on a media sheet.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An Oldham coupler assembly for of transferring rotary power between two shafts, comprising:
    an input plate and an output plate made of a first material, the input plate having gear teeth about a circumference of the input plate and the output plate having a spline assembly retained therein and centered about an axis of rotation of the output plate, the spline assembly biased outwardly from an outer face of the output plate and being axially slidable;
    a star plate made of a second material and positioned in between and mechanically coupled to the input plate and the output plate, the star plate having a first pair of opposed slots and a second pair of opposed slots, the first and second pairs of opposed slots positioned orthogonal to one another;
    a first pair of wheels rotatably fastened to an inner face of the input plate; and,
    a second pair of wheels rotatably fastened to an inner face of the output plate, the first pair of wheels rotatably engaging with respective opposed slots in one of the first and second pairs of opposed slots and the second pair of wheels rotatably engaging with respective opposed slots in the other of the first and second pairs of opposed slots, the first and second pairs of wheels moveably coupling the star plate to the input and output plates, respectively.

2. The Oldham coupler assembly of claim 1 wherein the first material is a plastic and the second material is metal.

3. The Oldham coupler assembly of claim 1, wherein the second material comprises a material selected from a group of materials including zinc, steel, nickel-phosphorous plated carbon steel, steel, aluminum, magnesium, brass, and bronze.

4. The Oldham coupler assembly of claim 1, wherein the output plate further comprises a collar axially extending from the outer face of the output plate, and the spline assembly comprises:
    a sleeve having a plurality of retention lugs radially outwardly extending from an outer wall of the sleeve and a plurality of drive lugs radially inwardly extending from an inner wall of the sleeve, the sleeve sized to be slidably received into the tubular collar with the plurality of retention lugs slidable received into a corresponding plurality of axial blind channels in an inner wall of the collar;
    a biasing member;
    a retainer clip; and,
    a pair of fasteners for attaching the retainer clip to the inner face of the outer plate with the biasing member seated between the retainer clip and the plurality of drive lugs.

5. The Oldham coupler assembly of claim 4, wherein the star plate, the retainer clip, the sleeve, and biasing member each have a central opening therethrough and the input plate further comprises a post positioned about an axis of rotation of the input plate and axially extending from the inner face thereof through the corresponding central openings of the star plate, the retainer clip and biasing member and into the sleeve.

6. The Oldham coupler assembly of claim 5 wherein the pair of fasteners also fasten the second pair of wheels to the inner face of the output plate.

7. The Oldham coupler assembly of claim 1, wherein the inner faces of the input plate and the output plate each have a plurality of spaced wear bumps.

8. The Oldham coupler assembly of claim 1 wherein each wheel in the first and second pairs of wheels has a flange having a diameter greater than the width of the respective slot in the star plate in which the wheel is positioned and the inner face of the input plate has a pair of opposed scalloped channels aligned with the second pair of wheels and the inner face of the output plate has a pair of opposed scalloped channels aligned with the first pair of wheels, the pairs of opposed scalloped channels in the input and output plate receiving the flanges of the each of the second and first pairs of wheels, respectively.

9. An Oldham coupler assembly for transferring rotary power between two shafts, comprising:
    an input plate and an output plate made of a plastic material, the input plate having gear teeth integrally molded about an outer circumference thereof;
    a star plate made of a metal and positioned in between and mechanically coupled to the input plate and the output plate, the star plate having a first pair of opposed slots and a second pair of opposed slots, the first and second pairs of opposed slots positioned orthogonal to one another;
    a first pair of wheels rotatably fastened to an inner surface of the input plate; and,
    a second pair of wheels rotatably fastened to an inner face of the output plate, the first pair of wheels rotatably engaging with respective opposed slots in one of the first and second pairs of opposed slots and the second pair of wheels rotatably engaging with respective opposed slots in the other of the first and second pairs of opposed slots, the first and second pairs of wheels moveably coupling the star plate to the input and output plates, respectively.

10. The Oldham coupler assembly of claim 9, wherein the metal is selected from a group of metals including zinc, steel, nickel-phosphorous plated carbon steel, steel, aluminum, magnesium, brass, and bronze.

11. The Oldham coupler assembly of claim 9, wherein the output plate further comprises a tubular collar axially extending from the outer face of the output plate and having slidably retained therein a spline assembly, the spline assembly comprising:
    a sleeve having a plurality of retention lugs radially outwardly extending from an outer wall of the sleeve retention lugs and a plurality of drive lugs radially inwardly extending from an inner wall of the sleeve, the sleeve sized to be slidably received into the tubular collar with the plurality of retention lugs slidably received into a corresponding plurality of axial channels in an inner wall of the tubular collar;
    a coil spring;
    a retainer clip; and,
    a pair of fasteners for attaching the retainer clip to the inner face of the outer plate with the coil spring seated between the retainer clip and the plurality of drive lugs.

12. The Oldham coupler assembly of claim 11, wherein the star plate, the retainer clip and biasing member each have a central opening therethrough and the input plate further comprises a post positioned about an axis of rotation of the input plate and axially extending from the inner face thereof through corresponding openings of the star plate, the retainer clip and biasing member and into the sleeve.

13. The Oldham coupler assembly of claim 11 wherein the pair of fasteners also fasten the second pair of wheels to the inner face of the output plate.

14. The Oldham coupler assembly of claim 9, wherein the inner faces of the input plate and the output plate each have a plurality of spaced wear bumps.

15. The Oldham coupler assembly of claim 9, wherein each wheel in the first and second pairs of wheels has a flange having a diameter greater than the width of the respective slot in the star plate in which the wheel is positioned and the inner face of the input plate has a pair of opposed scalloped channels aligned with the second pair of wheels and the inner face of the output plate has a pair of opposed scalloped channels aligned with the first pair of wheels, the pairs of opposed scalloped channels in the input and output plate receiving the flanges of the each of the second and first pairs of wheels, respectively.

16. A composite Oldham coupler assembly for transferring rotary power between two shafts, comprising:
an input plate and an output plate made of a plastic, the input plate having gear teeth integrally molded about an outer circumference thereof and a post positioned about an axis of rotation of the input plate and axially extending from the inner face thereof, the output plate having a spline assembly retained therein, the spline assembly biased outwardly from an outer surface of the output plate and being axially slidable;
a star plate made of a metal and positioned in between and mechanically coupled to the input plate and the output plate, the star plate having a first pair of opposed slots and a second pair of opposed slots, the first and second pairs of opposed slots positioned orthogonal to one another;
a first pair of wheels rotatably fastened to an inner face of the input plate, each wheel of the first pair of wheels having a flange spaced from the inner face of the input plate;
a second pair of wheels rotatably fastened to an inner face of the output plate, each wheel of the second pair of wheels having a flange spaced from the inner face of the output plate, the first pair of wheels rotatably engaging with respective opposed slots in one of the first and second pairs of opposed slots and the second pair of wheels rotatably engaging with respective opposed slots in the other of the first and second pairs of opposed slots with the inner face of the input plate having a pair of opposed scalloped recesses aligned with the second pair of wheels and in which the respective flanges of the second pair of wheels ride and the inner face of the output plate having a pair of opposed scalloped recesses aligned with the first pair of wheels and in which the respective flanges of the first pair of wheels ride.

17. The composite Oldham coupler assembly of claim 16, wherein the metal is selected from a group of metals including zinc, steel, nickel-phosphorous plated carbon steel, steel, aluminum, magnesium, brass, and bronze.

18. The Oldham coupler assembly of claim 16, wherein the output plate further comprises a tubular collar axially extending from the outer face of the output plate and having slidably retained therein the spline assembly, the spline assembly comprising:
a sleeve having a plurality of retention lugs radially outwardly extending from an outer wall of the sleeve retention lugs and a plurality of drive lugs radially inwardly extending from an inner wall of the sleeve, the sleeve sized to be slidably received into the tubular collar with the plurality of retention lugs slidably received into a corresponding plurality of axial blind channels in an inner wall of the tubular collar;
a biasing member;
a retainer clip; and,
a pair of fasteners for attaching the retainer clip to the inner face of the outer plate with the biasing member seated between the retainer clip and the plurality of drive lugs.

19. The Oldham coupler assembly of claim 18, wherein the star plate, the retainer clip and biasing member each have a central opening therethrough and the post on the inner face of the input plate extends through the corresponding openings of the star plate, the retainer clip and biasing member and into the sleeve.

20. The Oldham coupler assembly of claim 16, wherein the inner faces of the input plate and the output plate each have a plurality of spaced wear bumps.

21. The Oldham coupler assembly of claim 16, wherein the output plate and spline assembly provide a torsional stiffness of about 25 to about 30 in-oz/degree.

* * * * *